Dec. 8, 1925.
F. GELSTHARP
1,564,230
APPARATUS FOR MAKING SHEET GLASS
Filed Jan. 23, 1922   3 Sheets-Sheet 1
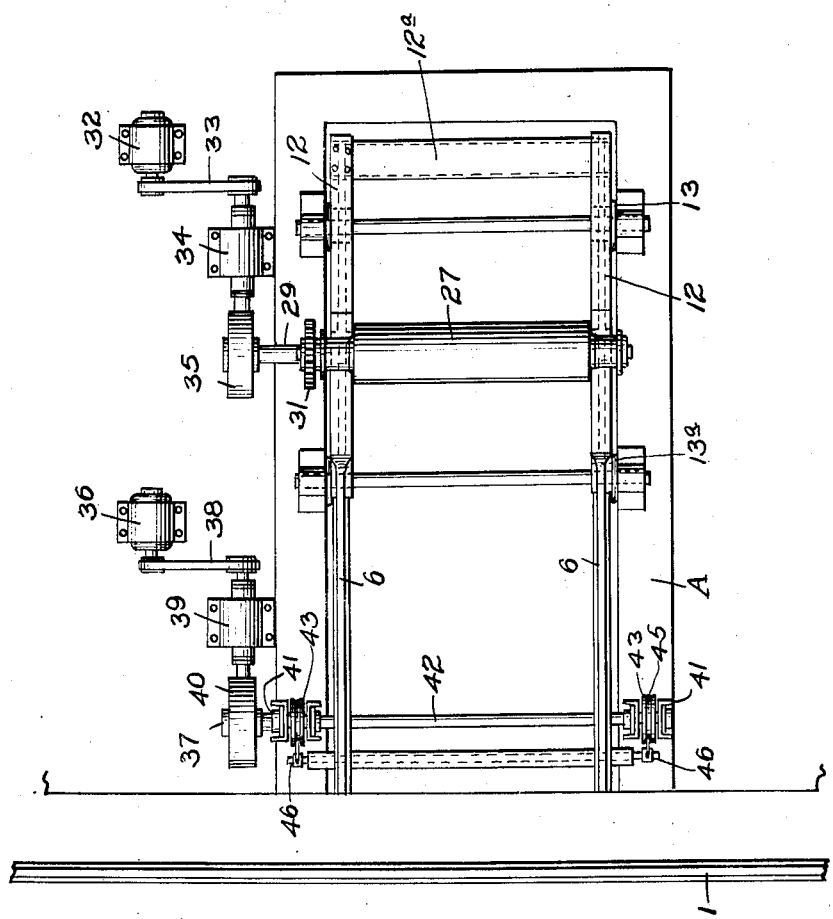
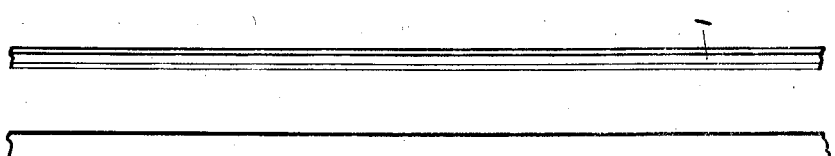
INVENTOR
Frederick Gelstharp
by
James C. Bradley
atty

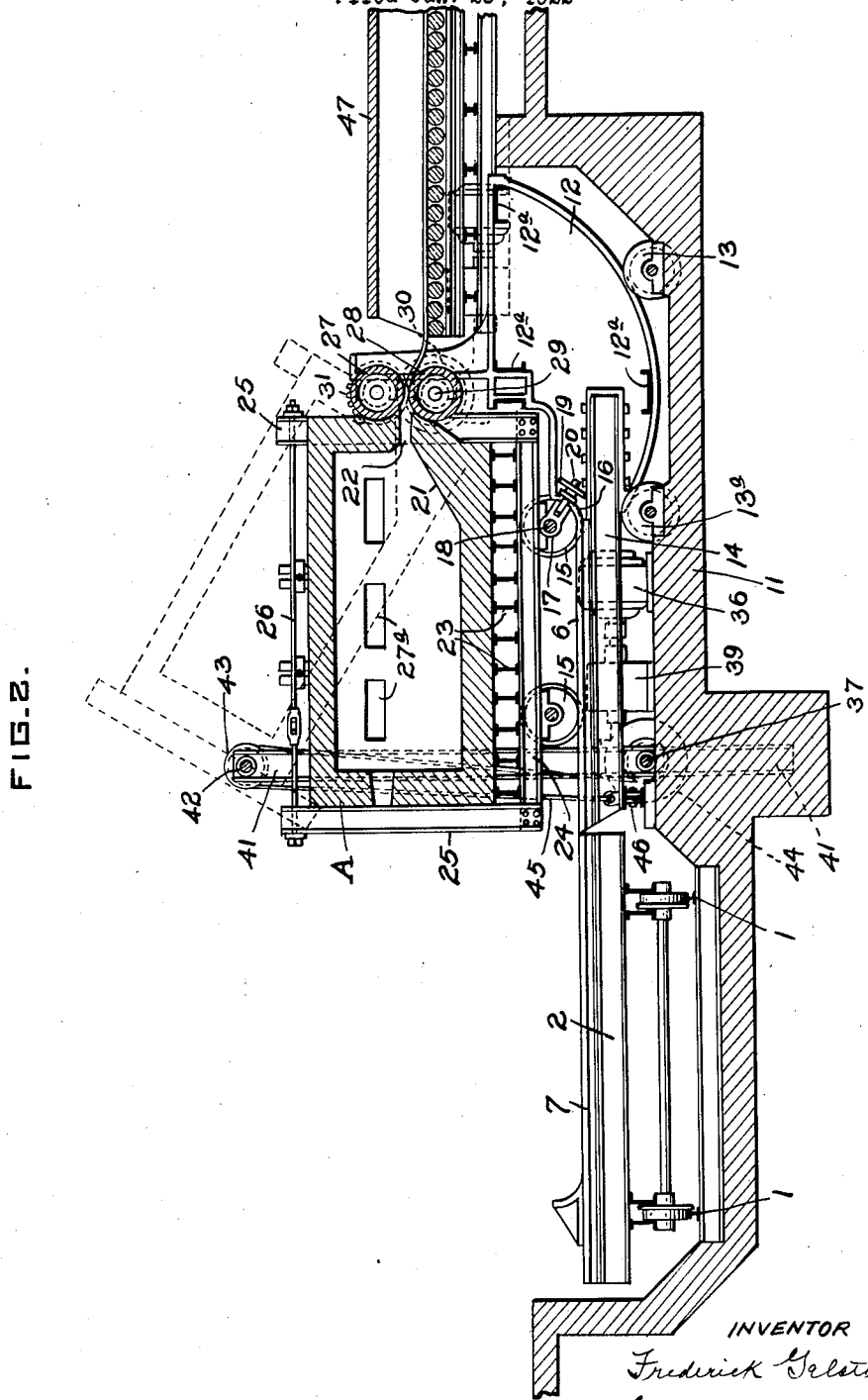

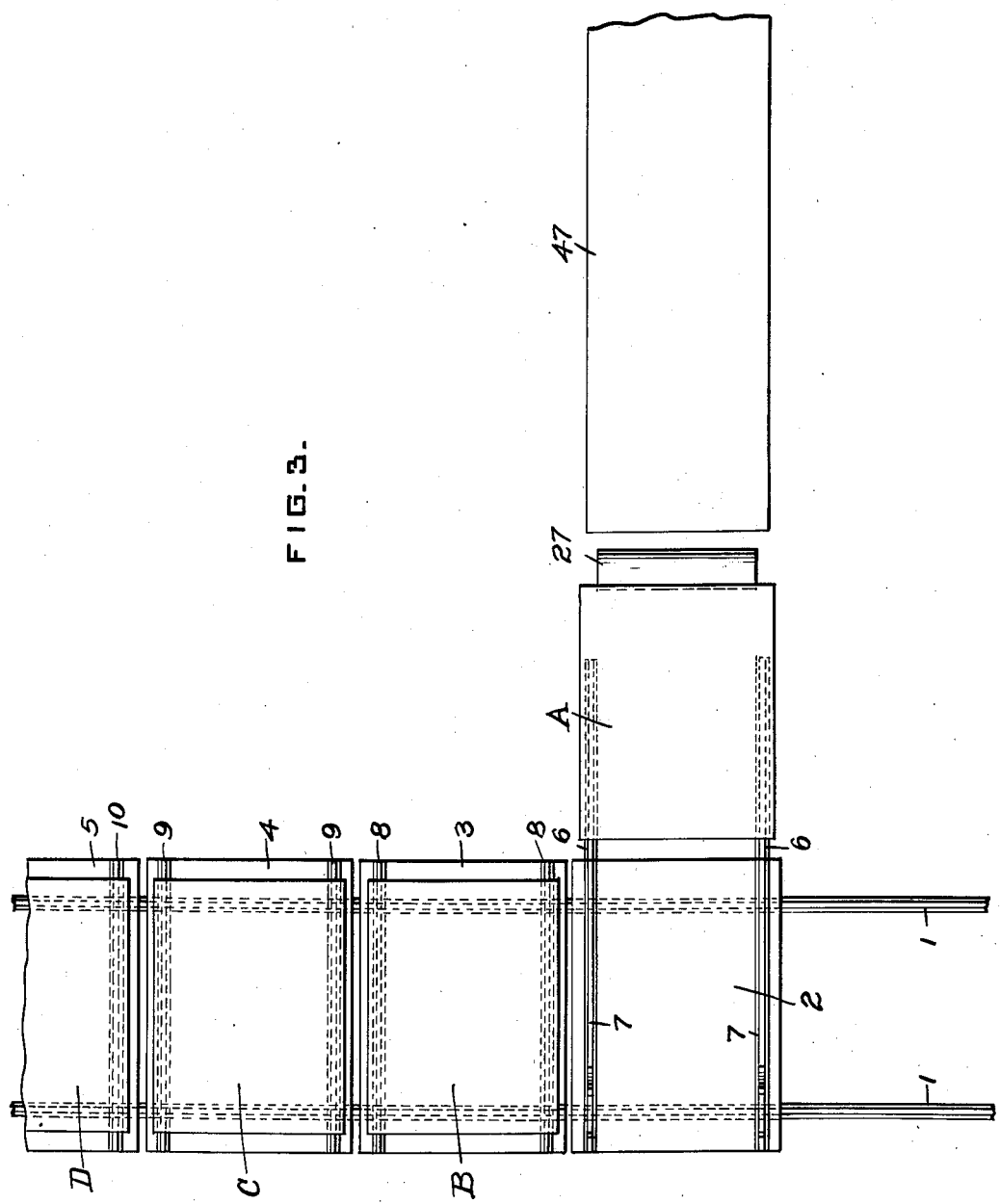

Patented Dec. 8, 1925.

1,564,230

UNITED STATES PATENT OFFICE.

FREDERICK GELSTHARP, OF TARENTUM, PENNSYLVANIA, ASSIGNOR TO PITTSBURGH PLATE GLASS COMPANY, A CORPORATION OF PENNSYLVANIA.

APPARATUS FOR MAKING SHEET GLASS.

Application filed January 23, 1922. Serial No. 531,056.

*To all whom it may concern:*

Be it known that I, FREDERICK GELSTHARP, a citizen of Great Britain, and a resident of Tarentum, in the county of Allegheny and State of Pennsylvania, have made a new and useful Invention in Improvements in Apparatus for Making Sheet Glass, of which the following is a specification.

The invention relates to the production of sheet glass in practically a continuous ribbon in accordance with the method set forth in my application Serial No. 656,441. In such application a melting tank and forehearth of the ordinary continuous type is illustrated, the intent being to make the production continuous by having a tank of such size that sufficient batch might be reduced to supply the requirement incident to the production of the ribbon. This may, with a wide sheet or ribbon, call for a tank of too great size because of the difficulty of properly reducing the batch therein or because of the practical considerations which impose a limit on the size of melting tanks. For the foregoing and other reasons it may be desirable to substitute for the single large continuous tank, a plurality of smaller intermittently working tanks in each of which a part of the glass going into glass ribbon may be reduced. By this means any desired quantity of glass may be delivered to the ribbon forming apparatus, and the glass may be subject to a melting and fining action in these tanks just as long as may be found necessary to produce the best quality of glass, all that is necessary being the requisite number of tanks to give the desired capacity. A track system is preferably employed and the tanks carried on suitable carriage or trucks so that the tanks may be brought one after another to the sheet or ribbon forming device placed opposite the end of the annealing leer. In order to provide a constant head of molten glass in the tanks during the discharging operation and to secure a complete discharge of the glass, the tanks are preferably arranged for tilting movement. One form which may be employed is illustrated in the accompanying drawings, wherein:

Figure 1 is a plan view of the apparatus. Fig. 2 is a vertical section through the apparatus, the dot and dash lines showing the tank in its extreme tilted position. Fig. 3 is a diagrammatic plan view illustrating the track arrangement for handling a plurality of the tanks.

The track system employed in handling the plurality of tilting tanks which are successively brought up to the ribbon forming rolls is preferably that illustrated in Fig. 3 and comprising the transverse track 1 upon which are mounted a plurality of trucks 2, 3, 4, 5, etc. and a short track 6 extending transversely of the track 1 and leading to the rolls. The trucks 2, 3, 4 and 5 are also each provided with tracks 7, 8, 9 and 10 which carry the various tilting clay tanks A, B, C, D, etc. In operation, one of the trucks is brought up to the position indicated in Fig. 3, at which time its track 7 is brought into alignment with the track 6 leading to the rolls, and the tank upon such truck, such as the tank A, is moved over to the position illustrated in Figs. 2 and 3. After this tank has been discharged, it is moved back onto the truck 2 again and this truck is moved longitudinally of the track 1 away from the other trucks, thus giving opportunity for bringing up truck 3 with its tank to a position such that the tank may be transferred to the track 6. Suitable track facilities (not shown) are provided for bringing the truck 2 and its tank A back to the other end of the track 1 so that this tank will be ready for use after the other tanks have been emptied.

The method of tilting the tanks and forming the glass flowing therefrom into a continuous ribbon or band will be understood by reference to Figs. 1 and 2. As here shown, a suitable foundation 11 of concrete is provided upon which is mounted a tilting framework which carries the rails 6 and the tank A. This framework preferably consists of a pair of steel castings 12 supported upon bearing rollers 13 and 13[a] and provided with sockets for receiving the rearwardly extending I beams 14 which are suitably secured in position by bolts or rivets. The castings 12 are secured together by the transverse channels 12[a]. Suitable cross braces between the I beams (not shown) are provided and the casting is shaped on each side so as to form stops for the wheels 15 of the tank as indicated at 16. After the tank has been brought to the position indicated in Fig. 2 suitable loop members 17 are placed around the front axle 18 and the hand wheels 19 on the screw rods 20 secured to such loops are operated to secure the tank in position against the stop members 16.

The tank A itself may be made of any desired shape or size, but is preferably provided with the inclined portion 21 adjacent its forward end and leading to the pouring slot 22 so that when the tank is tilted to the position indicated in dotted lines all of the glass will be drained out of the tank.

Because of the handling to which it is subjected, the clay work of the tank must be securely supported and reinforced. This is accomplished by the use of the transverse supporting beams 23 carried by the longitudinally extending beams 24, to which the axles of the wheels are secured. Upright I beams 25 are provided at the ends of the tanks, riveted to the beams 24 and secured at their upper ends by means of suitable tie rods 26. Any suitable means for melting the batch in the tank and keeping it at a suitable temperature for pouring may be employed, openings 27ª (Fig. 2) in the side and end walls being shown for the reception of suitable burners.

The ribbon forming device is carried by the upper portion of the castings 12 and comprises a pair of driven water cooled rolls 27—28, such rolls being more fully illustrated and described in my pending application, Serial No. 656,441 in which the rolls are disclosed as mounted upon a truck movable to and from the discharge tank, the discharge tank in such case being fixed. The rolls are hollow and cooled by means of water or other fluid and are driven from the shaft 29, which constitutes the axis of the lower roll 28 and also constitutes the axis around which the castings 12 rotate upon their rollers 13 and 13ª. The axle of the roll 28 is provided with a spur gear 30 which drives a similar spur gear 31 carried by the axle of the upper roll 27. The shaft 29 is driven from the motor 32 by means of the belt 33, speed reducing mechanism in the casing 34 and the worm drive in the casing 35.

The tank is tilted during the pouring operation to maintain the glass at a substantially uniform height throughout the discharging operation and also to entirely discharge the volume of glass from the tank. This is accomplished by means of the motor 36 which drives the shaft 37 (Fig. 2) through the intermediary of the belt 38, reducer 39 and worm drive 40. A pair of hoist columns 41 are secured in the concrete base 11 and carry the shafts 37 and 42, the latter of which is provided with a pair of sheaves 43. A pair of drums 44 are carried at ends of the shaft 37 and to these drums are secured a pair of cables 45 which pass up around the sheaves 43 and down to the ends of the transverse beam 46 which is in turn secured to the longitudinal beams 14 constituting a part of the tilting frame.

In operation the motor 36 is operated to tilt the supporting framework and tank gradually until the contents are discharged through the ribbon forming rolls. The ribbon as it is formed passes into the roller leer 47 placed adjacent the rolls and preferably made in accordance with the leer shown in my copending application of even date. It will be understood, however, that the invention is not limited to this type of leer or to the type of ribbon forming device shown and described, although such construction for forming the ribbon is the preferred one. A wide variety of means might also be employed for switching the tanks to and from the tilting means and for tilting them, the invention contemplating broadly the use of a plurality of melting or reducing tanks which are successively employed in connection with a ribbon forming mechanism and which are preferably tilted in discharging, although the invention is not limited to this tilting feature.

In so far as the process is concerned, the relative movement of the tanks, ribbon forming mechanism and leer might be variously secured aside from the way illustrated. The tanks might be carried past the rolls and leer on a circular track or on a turntable, or the series of tanks might be fixed instead of movable and the set of rolls and the leer mounted for movement transversely of such series of tanks, so that the discharge from the various tanks could be taken care of by the one set of rolls and the one leer.

What I claim is:

1. Apparatus for forming sheet glass, comprising a melting tank carrying a glass bath and having a passage through its wall, a pair of rolls lying opposite the passage and spaced apart to constitute the outlet orifice of the passage, means for rotating the rolls, a carriage upon which the tank is mounted for movement to and from the rolls, and means for tilting said carriage to discharge the glass therein through said passage.

2. Apparatus for forming sheet glass, comprising a plurality of melting tanks each adapted to carry a bath of molten glass and each having an outlet passage through its wall, a pair of driven rolls adapted to act as an orifice for said passages when the tanks are positioned adjacent thereto, means for mounting the tanks for movement whereby they may be successively moved to a position of discharge with respect to said rolls, and means for tilting the tanks to discharge the glass therein through said outlet passages.

3. Apparatus for forming sheet glass comprising a melting tank carrying a glass bath and having a passage through its wall, a pair of rolls lying opposite the passage and spaced apart to constitute the outlet orifice of the passage, means for rotating the rolls, a carriage upon which the tank is mounted for movement to and from the rolls, and means whereby the tank is mounted for tilting to discharge the molten glass between said rollers.

4. Apparatus for forming sheet glass, comprising a tank supported on wheels and carrying a glass bath, and having a passage through its wall, a tilting carrier adapted to receive the tank and provided with a pair of water cooled driven rolls in opposition to said passage, and a leer for receiving the sheet formed between the rolls.

5. Apparatus for forming sheet glass, comprising a tank supported on wheels and carrying a glass bath, and having a passage through its wall, a tilting carrier adapted to receive a tank and provided with a pair of water cooled driven rolls in opposition to said passage, and a leer for receiving the sheet formed between the rolls, the carrier having its axis of tilting coincident with the axis of rotation of the lower roll.

In testimony whereof, I have hereunto subscribed my name this 16th day of January, 1922.

FREDERICK GELSTHARP.